US012104761B2

(12) United States Patent
Fujiyama

(10) Patent No.: US 12,104,761 B2
(45) Date of Patent: Oct. 1, 2024

(54) VEHICLE LAMP

(71) Applicant: Stanley Electric Co., Ltd., Tokyo (JP)

(72) Inventor: Yoshihiro Fujiyama, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 18/559,050

(22) PCT Filed: May 12, 2022

(86) PCT No.: PCT/JP2022/020085
§ 371 (c)(1),
(2) Date: Nov. 4, 2023

(87) PCT Pub. No.: WO2022/244677
PCT Pub. Date: Nov. 24, 2022

(65) Prior Publication Data

US 2024/0240770 A1 Jul. 18, 2024

(30) Foreign Application Priority Data

May 21, 2021 (JP) ................................ 2021-086351

(51) Int. Cl.
*F21S 41/64* (2018.01)
*F21S 41/25* (2018.01)
*F21S 41/32* (2018.01)
*F21Y 115/10* (2016.01)

(52) U.S. Cl.
CPC ............ *F21S 41/645* (2018.01); *F21S 41/25* (2018.01); *F21S 41/321* (2018.01); *F21Y 2115/10* (2016.08)

(58) Field of Classification Search
CPC ........ F21S 41/645; F21S 41/25; F21S 41/321; F21Y 2115/10
See application file for complete search history.

(56) References Cited

U.S. PATENT DOCUMENTS

2020/0032977 A1 1/2020 Toko et al.

FOREIGN PATENT DOCUMENTS

JP 2010-250326 A 11/2010
JP 2020-013697 A 1/2020
JP 2020-017367 A 1/2020

OTHER PUBLICATIONS

International Search Report for PCT/JP2022/020085 dated Jul. 19, 2022.

*Primary Examiner* — Elmito Breval
(74) *Attorney, Agent, or Firm* — KENEALY VAIDYA LLP

(57) ABSTRACT

A vehicle lamp includes a light source configured to emit light, a liquid crystal element configured to variably modulate a polarization state of the light emitted from the light source, a condensing optical system configured to condense the light emitted from the light source toward the liquid crystal element, a polarization beam splitter configured to transmit light containing one of polarized components of the light condensed by the condensing optical system toward the liquid crystal element and configured to reflect light containing the other polarized component of the light condensed by the condensing optical system toward the light source, and a scattering and reflecting member disposed at a surrounding of the light source and configured to scatter and reflect the light reflected by the polarization beam splitter toward the condensing optical system.

7 Claims, 10 Drawing Sheets

VEHICLE LAMP

This application is a U.S. National Stage Application under 35 U.S.C § 371 of International Patent Application No. PCT/JP2022/020085 filed May 12, 2022, which claims the benefit of priority under 35 U.S.C. § 119 to Japanese Patent Application No. 2021-086351 filed May 21, 2021, the disclosures of all of which are hereby incorporated by reference in their entireties.

TECHNICAL FIELD

The present invention relates to a vehicle lamp.

BACKGROUND ART

In recent years, development of a light distribution variable headlamp (ADB: adaptive driving beam) configured to variably control a light distribution pattern of light projected toward a side in front of a vehicle has advanced. The ADB is a technology that expands a driver's front visual field at night by recognizing surrounding conditions such as preceding vehicles and oncoming vehicles with an on-vehicle camera and blocking light that gives glare to preceding vehicles and oncoming vehicles.

Incidentally, one of the methods of realizing such a vehicle lamp is to separate the light emitted from the light source into two polarized component lights and control the light of each polarized component with a liquid crystal element (for example, see the following Patent Document 1).

For example, the following Patent Document 1 discloses a vehicle lamp including a light source, a projection optical system configured to project light emitted from the light source forward, a liquid crystal element disposed so as to match a rear side focus of the projection optical system, a first polarizing plate disposed in an optical path between the liquid crystal element and the projection optical system and through which light with a specified polarized component passes, a condensing optical system configured to condense the light emitted from the light source toward the liquid crystal element, a polarization beam splitter configured to split the light emitted from the light source into first light including one polarized component and second light including another polarized component, a reflecting optical system configured to reflect the first light toward the liquid crystal element, and a polarization rotation element that is configured to rotate a polarization direction of any one light of the first light and the second light and that is configured to coincide it with a polarization direction of the other light.

CITATION LIST

Patent Document

[Patent Document 1]
Japanese Unexamined Patent Application, First Publication No. 2020-013697

SUMMARY OF INVENTION

Technical Problem

However, in the invention disclosed in the above-mentioned Patent Document 1, since the light emitted from the light source is separated into lights with two polarized components and the lights with the polarized components are controlled and used by the liquid crystal element, the polarization rotation element is required. In this case, increasing the number of parts and securing an installation space for the parts will lead to complication and enlargement of a structure.

An aspect of the present invention is directed by providing a vehicle lamp capable of increasing efficiency of utilization of light and capable of further reduction in size by reducing the number of parts and simplifying the structure.

Solution to Problem

An aspect of the present invention provides the following configurations.

(1) A vehicle lamp including:

a light source configured to emit light;

a liquid crystal element configured to variably modulate a polarization state of the light emitted from the light source;

a condensing optical system configured to condense the light emitted from the light source toward the liquid crystal element;

a polarization beam splitter configured to transmit light containing one of polarized components of the light condensed by the condensing optical system toward the liquid crystal element and configured to reflect light containing the other polarized component of the light condensed by the condensing optical system toward the light source; and a scattering and reflecting member disposed at a surrounding of the light source and configured to scatter and reflect the light reflected by the polarization beam splitter toward the condensing optical system.

(2) The vehicle lamp according to the above-mentioned (1), including a polarizing plate disposed close to the liquid crystal element at front of the liquid crystal element and configured to transmit light with a specified polarized component among the light modulated by the liquid crystal element, wherein the liquid crystal element is located at a condensing point of the light condensed by the condensing optical system or in a vicinity of the condensing point of the light condensed by the condensing optical system.

(3) The vehicle lamp according to the above-mentioned (1) or (2), wherein the condensing optical system includes a condensing lens which includes an incidence part located at a side facing the light source and configured to allow entry of the light emitted from the light source, an emission part located at a side opposite to the incidence part and configured to emit the light entering from the incidence part toward outside, and a reflection part located at a surrounding between the incidence part and the emission part and configured to reflect the light entering from the incidence part toward the emission part.

(4) The vehicle lamp according to the above-mentioned (3), wherein the reflection part includes an oval reflecting surface.

(5) The vehicle lamp according to the above-mentioned (3), wherein the reflection part includes a parabolic reflecting surface.

(6) The vehicle lamp according to any one of the above-mentioned (3) to (5), wherein the condensing lens has a rotationally symmetrical form with respect to a center axis of the condensing lens, and is disposed in a state in which the center axis coincides with an optical axis of the light emitted from the light source.

(7) The vehicle lamp according to the above-mentioned (2), including a projection optical system disposed in front of the polarizing plate and configured to project the light passing through the polarizing plate forward.

Advantageous Effects of Invention

According to the aspect of the present invention, it is possible to provide a vehicle lamp capable of increasing efficiency of utilization of light and capable of further reduction in size by reducing the number of parts and simplifying the structure.

DESCRIPTION OF EMBODIMENTS

Figure 1:
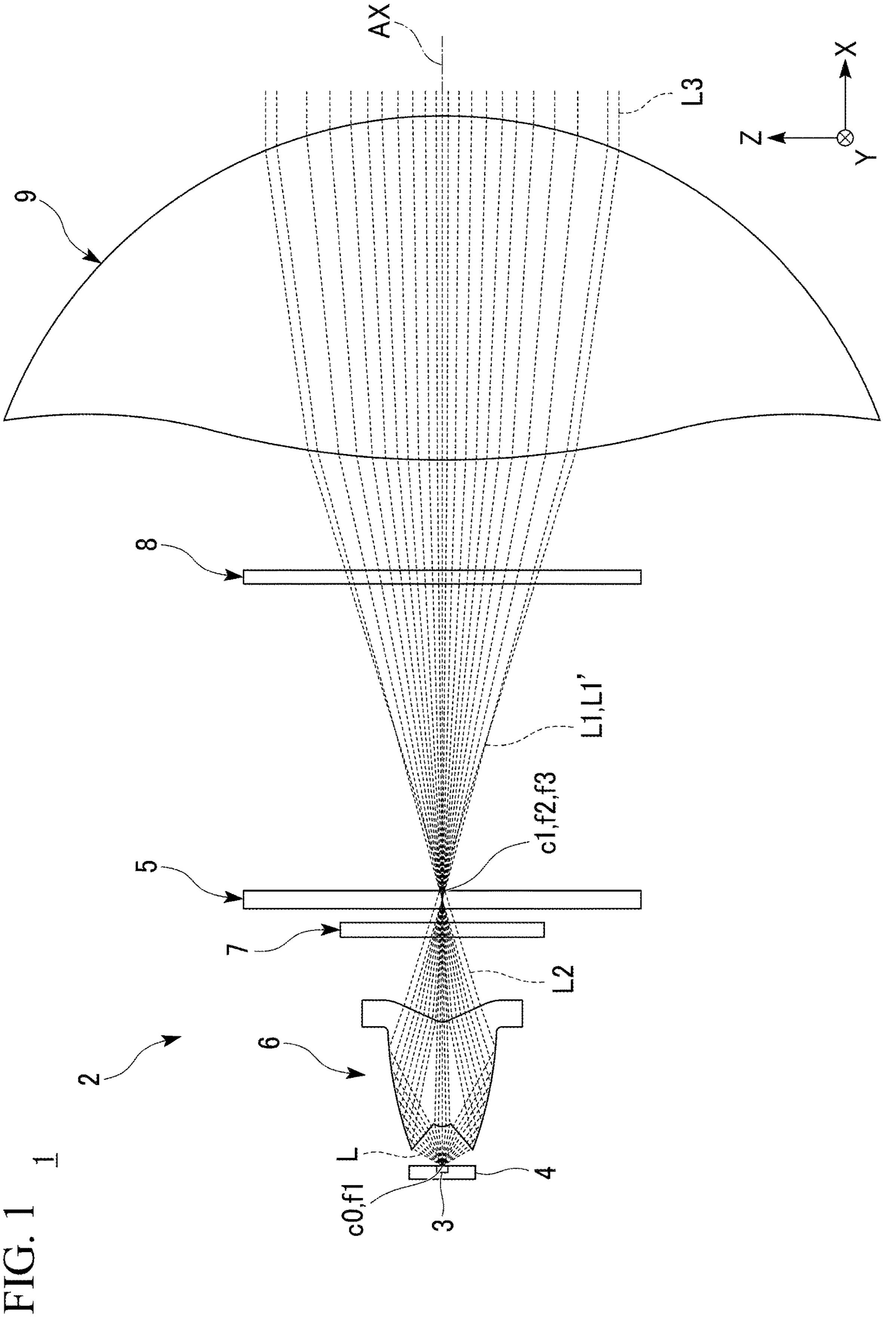
FIG. 1 is a cross-sectional view showing a configuration of a lighting unit included in a vehicle lamp according to an embodiment of the present invention.

Hereinafter, an embodiment of the present invention will be described with reference to the accompanying drawings.

Further, in the drawings used in the following description, scales of dimensions may vary depending on components in order to make each component easier to see, and the dimensional ratios of each component may not necessarily be the same as the actual ones.

In addition, in the drawings described below, an XYZ orthogonal coordinate system is set, an X-axis direction indicates a forward/rearward direction (lengthwise direction) of a vehicle lamp, a Y-axis direction indicates a leftward/rightward direction (widthwise direction) of the vehicle lamp, and a Z-axis direction indicates an upward/downward direction (height direction) of the vehicle lamp.

Figure 2:
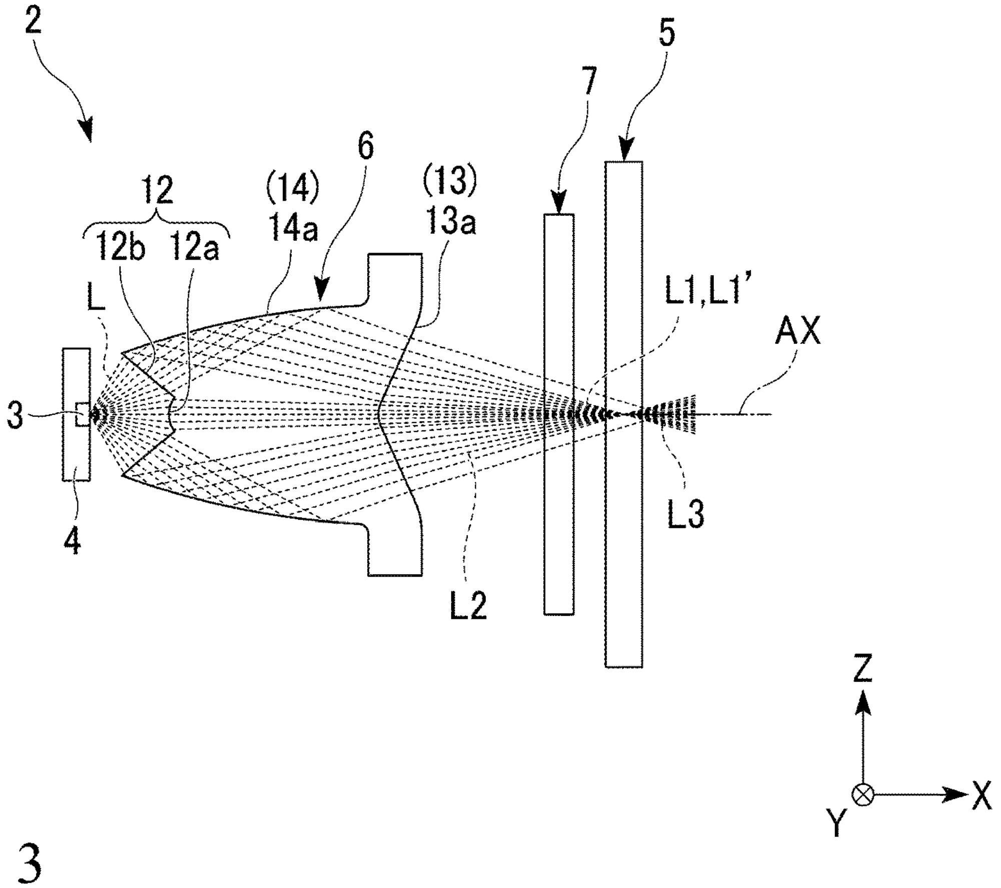
FIG. 2 is an enlarged cross-sectional view of a major part of the lighting unit shown in FIG. 1.
Figure 3:
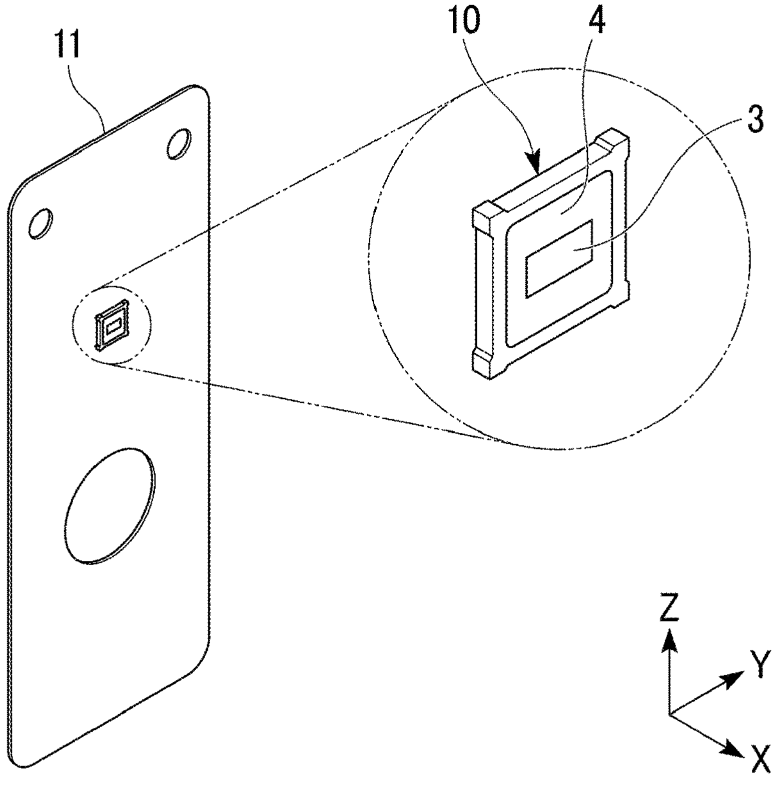
FIG. 3 is a perspective view showing a light source package including a light source and a scattering and reflecting member.
Figure 4:
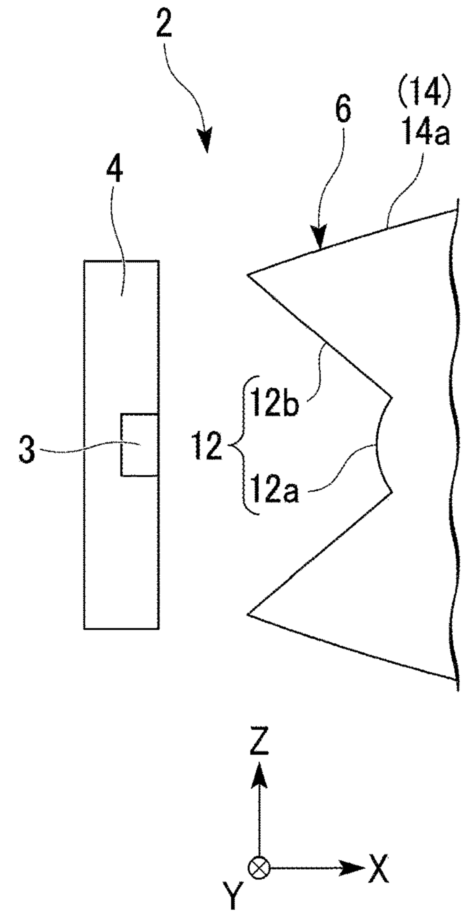
FIG. 4 is a cross-sectional view showing disposition of the light source and the scattering and reflecting member with respect to a condensing optical system.
Figure 5A:
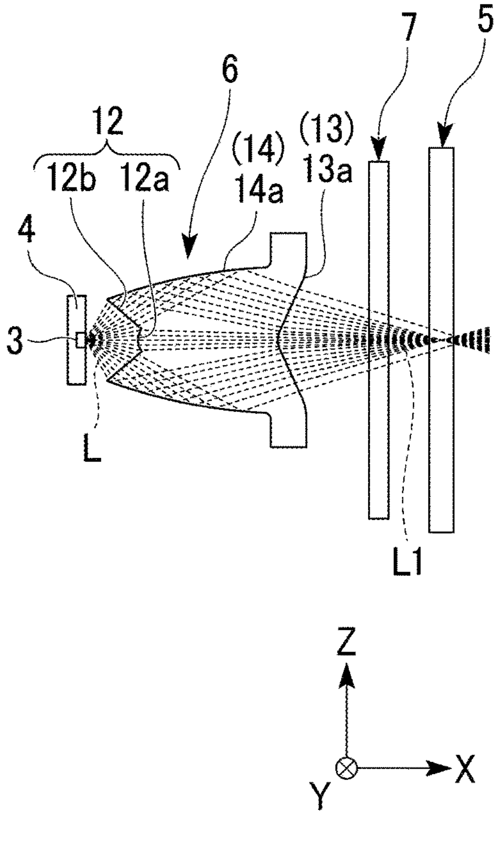
FIG. 5A is a cross-sectional view showing an optical path of the light emitted from the light source and showing the optical path of the light passed through a polarization beam splitter.
Figure 5B:
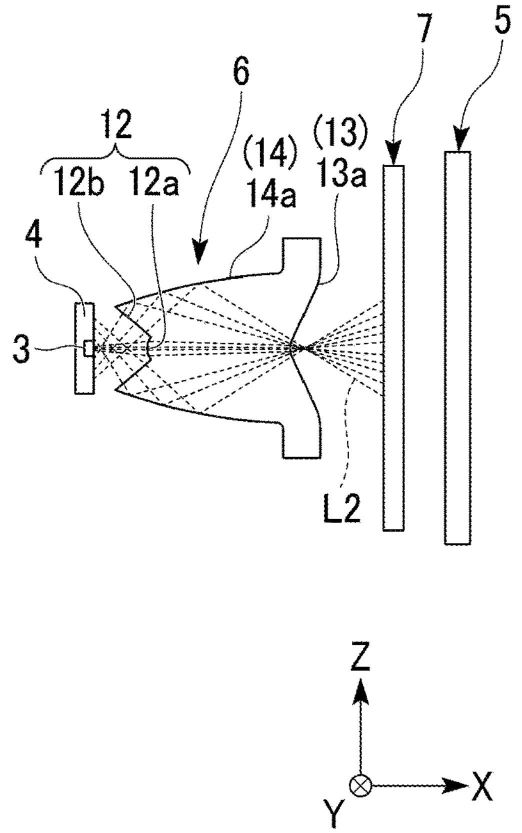
FIG. 5B is a cross-sectional view showing an optical path of the light emitted from the light source and showing an optical path of the light reflected by the polarization beam splitter.
Figure 5C:
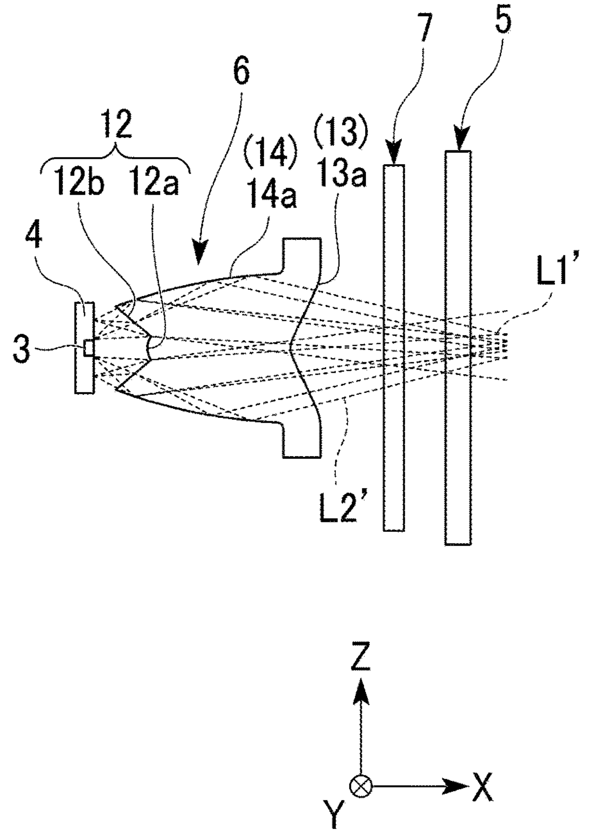
FIG. 5C is a cross-sectional view showing an optical path of the light emitted from the light source and showing an optical path of the light reflected by the scattering and reflecting member.

As an embodiment of the present invention, for example, a vehicle lamp 1 shown in FIG. 1 to FIG. 5 will be described. Further, FIG. 1 is a cross-sectional view showing a configuration of a lighting unit 2 included in the vehicle lamp 1. FIG. 2 is an enlarged cross-sectional view of a major part of the lighting unit 2. FIG. 3 is a perspective view showing a light source package 10 including a light source 3 and a scattering and reflecting member 4. FIG. 4 is a cross-sectional view showing disposition of the light source 3 and the scattering and reflecting member 4 with respect to a condensing optical system (condensing lens) 6. FIG. 5A is a cross-sectional view showing an optical path of light L emitted from the light source 3 and showing an optical path of the light L passed through a polarization beam splitter (PBS) 7. FIG. 5B is a cross-sectional view showing an optical path of the light L emitted from the light source 3 and showing an optical path of the light L reflected by the polarization beam splitter (PBS) 7. FIG. 5C is a cross-sectional view showing an optical path of the light L emitted from the light source 3 and showing an optical path of the light L reflected by the scattering and reflecting member 4.

The vehicle lamp 1 of this embodiment is, for example, a headlight (headlamp) for a vehicle mounted in the front of the vehicle, which is obtained by applying the present invention to a light distribution variable headlamp (ADB) that variably controls a light distribution pattern of light projected toward a side in front of the vehicle.

Specifically, the vehicle lamp 1 includes the lighting unit 2 as shown in FIG. 1 and FIG. 2. The vehicle lamp 1 has a structure in which the lighting unit 2 is disposed inside a lighting body constituted by a housing with a front surface (not shown) open, and a transparent lens cover configured to cover the opening of the housing.

The lighting unit 2A includes the light source 3, the scattering and reflecting member 4, a liquid crystal element 5, the condensing optical system 6, the polarization beam splitter (PBS) 7, a polarizing plate 8, and a projection optical system 9.

The light source 3 is configured to emit non-polarized (unpolarized) light L. In the embodiment, as the light source 3, for example, a light emission diode (LED) configured to emit white light is used. Further, for the light source 3, other than the above-mentioned LEDs, for example, light emission elements such as laser diodes (LD) can be used.

The scattering and reflecting member 4 is disposed to surround the light source 3 using a white resin having a high reflectance of the light L2 on a surface thereof. In addition, as shown in FIG. 4, the scattering and reflecting member 4 is disposed at a position where the light L entering the condensing optical system 6 from the light emission surface of the light source 3 is not blocked. Further, as for the scattering and reflecting member 4, in addition to the white resin mentioned above, for example, a metal with a roughened surface can be used.

The light source 3 and the scattering and reflecting member 4 constitute the light source package 10 as shown in FIG. 3. The light source package 10 radially emits the light L emitted from the light source 3 forward (toward a +X-axis direction) in a state in which the light source package 10 is mounded on one surface (in the embodiment, a front surface) of a circuit board 11 on which a driving circuit configured to drive an LED (the light source 3) is mounted.

Further, the circuit board 11 is not limited to the configuration in which the driving circuit described above is provided, and may have a configuration in which a mounting board on which the light source package 10 is mounted and a circuit board on which the driving circuit is provided are separately arranged, and the mounting board and the circuit board are electrically connected via a wiring cord called a harness. Accordingly, the driving circuit can be protected from heat emitted from the light source package 10 (the light source 3).

In addition, a heat sink configured to radiate heat generated by the light source package 10 (the light source 3) to the outside and a cooling fan configured to blow air toward the heat sink may be provided on the back surface side of the circuit board 11. Accordingly, the heat emitted from the light source package 10 (the light source 3) can be efficiently radiated.

As shown in FIG. 1 and FIG. 2, the liquid crystal element 5 is constituted by a transmissive liquid crystal panel (LCD) disposed in front of (on an +X axis side) of the condensing optical system 6. In addition, the liquid crystal element 5 is disposed in a state in which a center axis AX thereof coincides with an optical axis of the light L emitted from the light source 3.

The liquid crystal element 5 controls an image (light distribution pattern) of the light L projected toward a side in front of the projection optical system 9 while variably modulating a polarization state of the light passing through the liquid crystal element 5 using a liquid crystal driving circuit (not shown) configured to control a driving voltage applied between electrodes.

Further, the liquid crystal element 5 may be a segment type in which a driving voltage applied between the electrodes in one segment is controlled to switch the modulation of the light L, or a dot matrix type in which a driving voltage applied between the electrodes of each of dots (pixels) arranged in a matrix is controlled to switch the modulation of the light L in an arbitrary area.

The condensing optical system 6 is constituted by a condensing lens (hereinafter, referred to as "the condensing lens 6") disposed in front of the light source 3. In addition, the condensing lens 6 has a rotationally symmetrical form with respect to the center axis AX of the condensing lens 6, and is disposed in a state in which the center axis AX coincides with the optical axis of the light L emitted from the light source 3. Further, the condensing lens 6 may be formed of a material having a higher refractive index than that of air, for example, a transparent resin such as polycarbonate, acryl, or the like, glass, or the like.

The condensing lens 6 has an incidence part 12 located on a side facing the light source 3 and into which the light L emitted from the light source 3 enters, an emission part 13 located on a side opposite to the incidence part 12 and configured to emit the light L entering from the incidence part 12 to the outside, and a reflection part 14 located at the surrounding between the incidence part 12 and the emission part 13 and configured to reflect the light L entering from the incidence part 12 toward the emission part 13.

The incidence part 12 has a first condensing incident surface 12*a* having a convex surface shape, located at a portion facing the light source 3 and into which some of the light L emitted from the light source 3 enters, and a second condensing incident surface 12*b* having a substantially cylindrical shape, located on an inner circumferential side of a portion protruding from a position surrounding around the first condensing incident surface 12*a* toward the light source 3, and into which some of the light L emitted from the light source 3 enters.

The emission part 13 has a light emission surface 13*a* having a central portion recessed rearward and curved in a convex shape from the central portion toward the outer circumferential portion. The light emission surface 13*a* condenses and emits the light L entering from the first condensing incident surface 12*a* forward, and condenses and emits the light L reflected by the reflection part 14 forward.

The reflection part 14 has an oval reflecting surface 14*a* curved in a concave shape to draw an oval line. The oval reflecting surface 14*a* condenses and reflects the light L entering from the second condensing incident surface 12*b* toward the emission part 13.

The condensing lens 6 causes a rear side focus f1 thereof to coincide with a light emission point C0 of the light source 3, and causes a front side focus f2 to coincide with a condensing point C1 of the liquid crystal element 5. Accordingly, the condensing lens 6 condenses the light L emitted from the emission part 13 toward the liquid crystal element 5 in front thereof. Further, the lighting unit 2 is not limited to the configuration in which the liquid crystal element 5 is located on the condensing point C1 of the light condensed by the condensing lens 6, and may have a configuration in which the liquid crystal element 5 is located in the vicinity of the condensing point C1.

The PBS 7 separates the light L emitted from the light source 3 into the light L1 including one polarized component (for example, P-polarized component) and the light L2 including the other polarized component (for example, S-polarized component). Further, for the PBS 7, for example, a wire grid type, an optical multi-layer film, or the like, can be used.

The PBS 7 is disposed in an optical path of the light L advancing from the condensing lens 6 toward the liquid crystal element 5. In addition, the PBS 7 is disposed in a state in which the center axis AX thereof coincides with the optical axis of the light L emitted from the light source 3.

Accordingly, among the light L condensed by the condensing lens 6, the PBS 7 transmits the light L1 including one polarized component toward the liquid crystal element 5 in front thereof, and reflects the light L2 including the other polarized component (for example, S-polarized component) toward the light source 3 in the rear thereof.

In addition, as shown in FIG. 5A, the light L1 passing through the PBS 7 is condensed at the condensing point C1 located at a position that coincides with the liquid crystal element 5. Meanwhile, as shown in FIG. 5B, the light L2 reflected by the PBS 7 enters from the emission part 13 of the condensing lens 6, is reflected by the reflection part 14, then, is emitted from the incidence part 12, and enters the scattering and reflecting member 4 in the rear thereof.

Here, as the above mentioned condensing lens 6 has a rotationally symmetrical form with respect to the center axis AX, the light L2 reflected by the PBS 7 follows the same optical path as the light L guided from the incidence part 12 of the condensing lens 6 toward the emission part 13 and is guided from the emission part 13 of the condensing lens 6 toward the incidence part 12. For this reason, the light L2 emitted from the incidence part 12 of the condensing lens 6 can enter the scattering and reflecting member 4 located in the vicinity of the light source 3.

As shown in FIG. 5C, the light L2 entering the scattering and reflecting member 4 is scattered and reflected toward the condensing lens 6 in front thereof. Accordingly, light L2' reflected by the scattering and reflecting member 4 becomes non-polarized light while being scattered. In addition, the light L2' reflected by the scattering and reflecting member 4 enters from the incidence part 12 of the condensing lens 6, is reflected by the reflection part 14, then, is emitted from the emission part 13, and enters the PBS 7.

Here, among the light L2' reflected by the scattering and reflecting member 4, the PBS 7 transmits the light L1' including one polarized component toward the liquid crystal element 5 in front thereof, and reflects the light L2 (not shown in FIG. 5C) including the other polarized component (for example, S-polarized component) toward the light source 3 in the rear thereof.

Accordingly, the light L2 reflected by the PBS 7 is reused while repeating reflections between the PBS 7 and the scattering and reflecting member 4 until it becomes the light L1' including one polarized component that passes through the PBS 7.

Meanwhile, since the light L1' transmitted through the PBS 7 is light L2' reflected by the scattering and reflecting member 4 located at the surrounding of the light emission surface of the light source 3, the light L1' transmitted through the PBS 7 is not condensed at the condensing point C1 and enters the liquid crystal element 5 from the surrounding of the condensing point C1.

Figure 6:
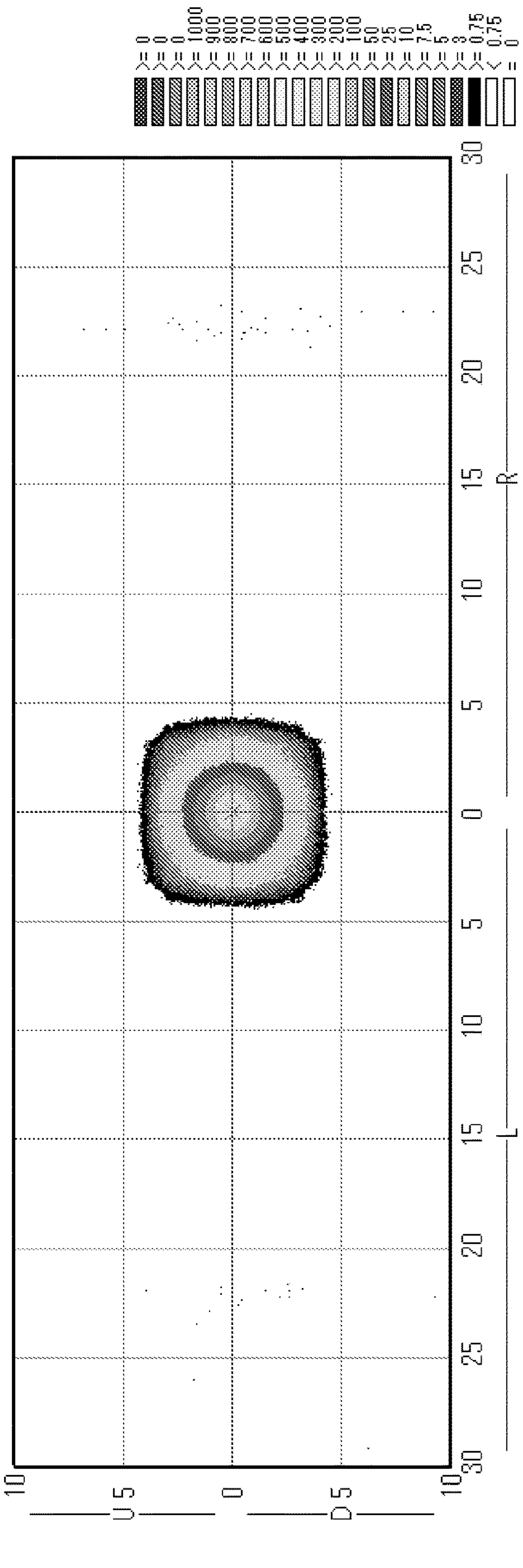
FIG. 6 is a light intensity distribution diagram showing a light distribution pattern formed on a surface of a virtual vertical screen by the light shown in FIG. 5A.
Figure 7:
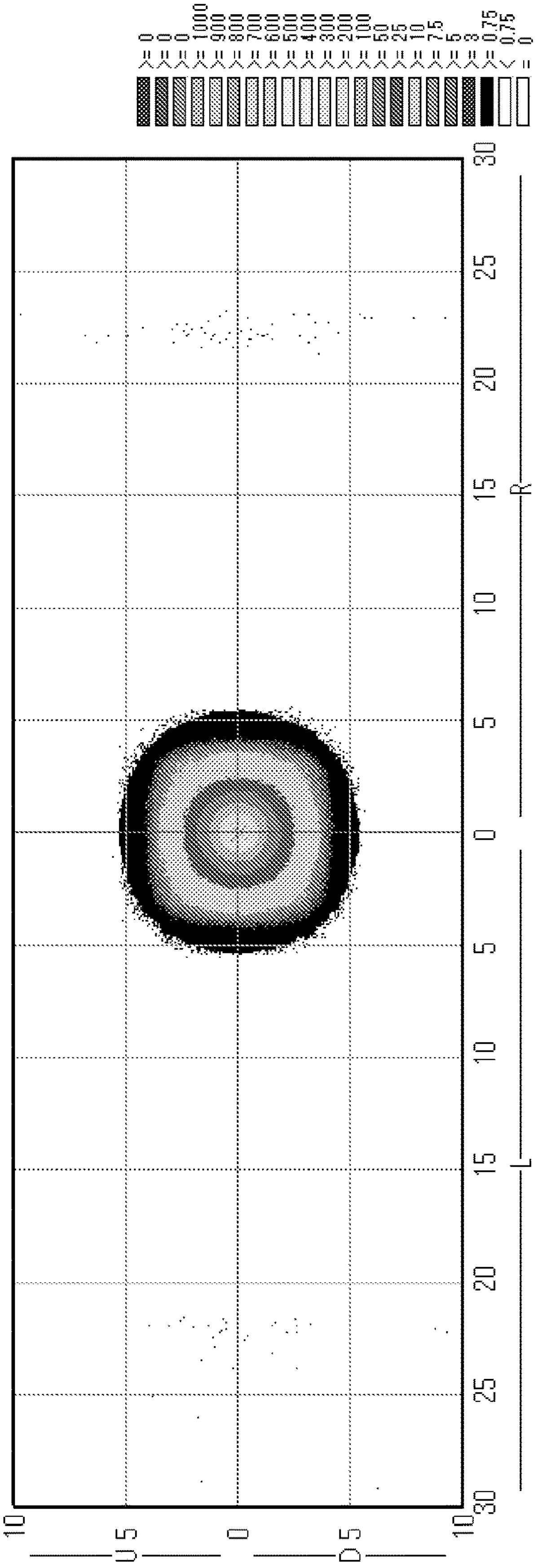
FIG. 7 is a light intensity distribution diagram showing a light distribution pattern formed on the surface of the virtual vertical screen by the light shown in FIG. 5A and the light shown in FIG. 5C.

Accordingly, the light L1 passing through the PBS 7 shown in FIG. 5A forms a light distribution pattern as shown in FIG. 6 on the surface of the virtual vertical screen. On the other hand, the lights L1 and L1' passing through the PBS 7 shown in FIG. 5C form a light distribution pattern as shown in FIG. 7 on the surface of the virtual vertical screen. The light distribution pattern shown in FIG. 7 is greater than the light distribution pattern shown in FIG. 6 due to the addition of the reused light L1' to the light L1 passing through the PBS 7.

As shown in FIG. 1 and FIG. 2, the polarizing plate 8 is disposed in the vicinity of the liquid crystal element 5 in front of the liquid crystal element 5. Among the lights L1 and L1' entering the liquid crystal element 5, the polarizing plate 8 transmits light L3 having a specified polarized component modulated by the liquid crystal element 5. That is, the polarizing plate 8 transmits the light L3 of the polarized component corresponding to the light distribution pattern of the lights L1 and L1' controlled by the liquid crystal element 5, and blocks the light of other polarized components. Accordingly, according to the light distribution pattern of the light controlled by the liquid crystal element 5, the light L3 modulated by the liquid crystal element 5 can be selectively transmitted.

In addition, in the optical path between the polarizing plate 8 and the liquid crystal element 5, an optical compensation plate may be placed to compensate for a phase difference of the light L3 modulated by the liquid crystal element 5 as required. The optical compensation plate can improve a polarization degree of the light L3 modulated by the liquid crystal element 5. As a result, it is possible to improve contrast of the light distribution pattern of the light controlled by the liquid crystal element 5.

Further, the polarizing plate 8 is preferably spaced apart from the liquid crystal element 5 because it generates heat by blocking (absorbing) the above-mentioned light, however, in order to facilitate formation of light distribution by the liquid crystal element 5, it is preferable to arrange the polarizing plate 8 close to the liquid crystal element 5 as much as possible.

In the lighting unit 2A, since the liquid crystal element 5 is located at the condensing point C1 of the light L condensed by the condensing lens 6 and the condensing point of the condensing lens is set on the liquid crystal element, the polarizing plate 8 and the condensing point C1 can be brought closer by bringing the polarizing plate 8 closer to the liquid crystal element 5.

Accordingly, the light reflected by the polarizing plate 8 follows the optical path close to the time when it entered the polarizing plate 8, and the light is reflected by the scattering and reflecting member 4 near the light source 3 and enters the polarizing plate 8 again without spreading. Accordingly, as shown in FIG. 7, it becomes possible to form a light distribution that shows only a slight spread compared to the light distribution shown in FIG. 6, making it easier to form a light distribution using a projection lens 9 described later.

Further, if the liquid crystal element 5 and the polarizing plate 8 are spaced far apart from each other, since the distance between the condensing point C1 and the polarizing plate 8 increases, the optical paths of the light entering the polarizing plate 8 and the light reflected by the polarizing plate 8 becomes greatly deviated. In this case, since the reflected light does not condense near the light source 3 and spreads widely, this widely spread light is reflected by the scattering and reflecting member 4 and enters the polarizing plate 8, resulting in a wider light distribution than shown in FIG. 7.

The projection optical system 9 is constituted by at least one or a plurality of (in the embodiment, 1) projection lenses (hereinafter, referred to as "the projection lens 9") disposed in front of the polarizing plate 8. Further, the projection lens 9 may be formed of a material having a higher refractive index that air, for example, a transparent resin such as polycarbonate, acryl, or the like, glass, or the like.

The projection lens 9 is disposed in a state in which the center axis AX thereof coincides with the optical axis of the light L emitted from the light source 3. In addition, the projection lens 9 is disposed so as to match a rear side focus f3 of the projection lens 9 with the liquid crystal element 5. That is, the liquid crystal element 5 is located at the rear side focus f3 of the projection lens 9 or in the vicinity thereof. The projection lens 9 projects the light L3 passing through the polarizing plate 8 forward.

In the vehicle lamp 1 of the embodiment having the above-mentioned configuration, a control circuit unit (not shown) configured to control the lighting unit 2 calculates a region to be blocked while determining surrounding information such as preceding vehicle, oncoming vehicles, or the like by using an image obtained from cameras installed in the vehicle or information of various sensor installed in the vehicle, and transmits the information of the region to be blocked to a liquid crystal driving circuit as a control signal.

The liquid crystal driving circuit controls the image (light distribution pattern) of the light L3 projected by the projection lens 9 while controlling driving of the liquid crystal element 5 on the basis of the control signal from the control circuit unit. Accordingly, the light distribution pattern of the light L3 projected from the projection lens 9 toward a side in front of the vehicle can be variably controlled.

That is, as an ADB, the vehicle lamp 1 of this embodiment recognizes the surrounding conditions such as preceding and oncoming vehicles using an on-vehicle camera or the like and blocks lights that give glare to the preceding and oncoming vehicles, and thus, it is possible to enlarge the front visual field of the driver at night.

Incidentally, in the vehicle lamp 1 of the embodiment, as the above mentioned scattering and reflecting member 4 reflects the light L2 reflected by the PBS 7 while scattering, reflection is repeated between the scattering and reflecting member 4 and the PBS 7 until the light L2 reflected by the PBS 7 becomes the light L1' passes through the PBS 7. Accordingly, the light L2 reflected by the PBS 7 can be reused, and efficiency of utilization of the light L emitted from the light source 3 can be increased.

Figure 8:
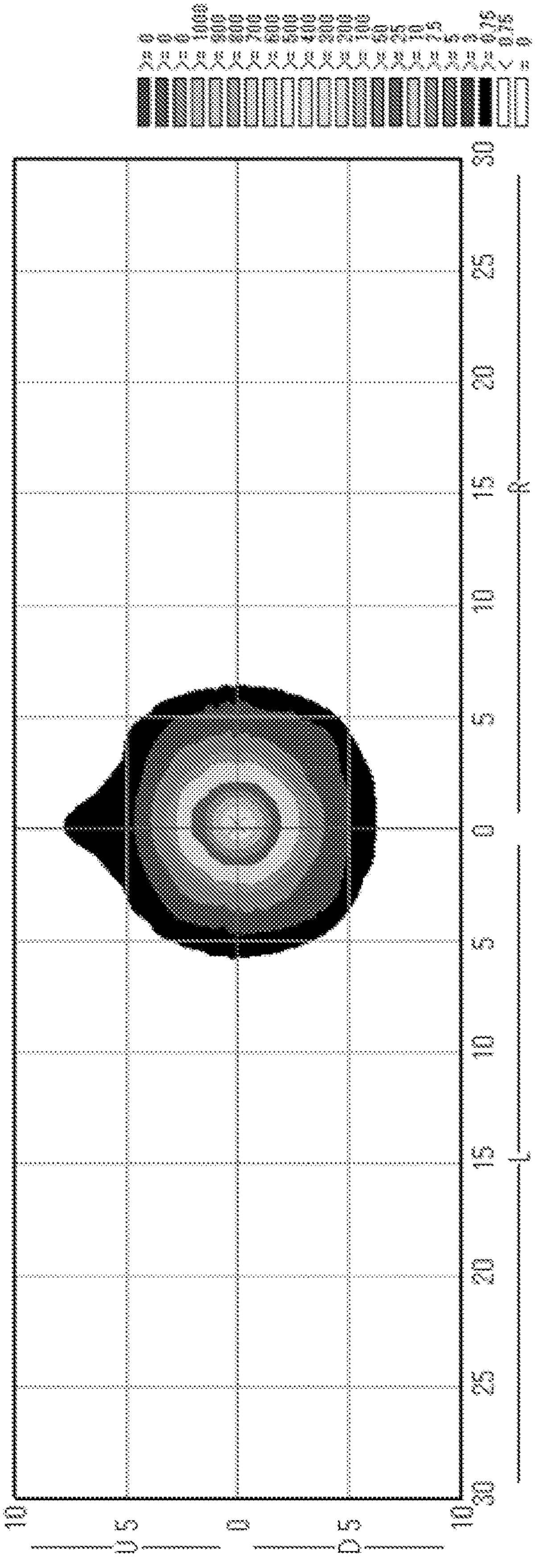
FIG. 8 is a light intensity distribution diagram showing a light distribution pattern formed on the surface of the virtual vertical screen by the light emitted from the lighting unit when the scattering and reflecting member is not provided.

Here, FIG. 8 shows the light distribution pattern formed on the surface of the virtual vertical screen by the light L3 emitted from the lighting unit 2 when the scattering and reflecting member 4 is not provided. Meanwhile, FIG. 9 shows the light distribution pattern formed on the surface of the virtual vertical screen by the light emitted from the lighting unit when the scattering and reflecting member 4 is present.

Figure 9:
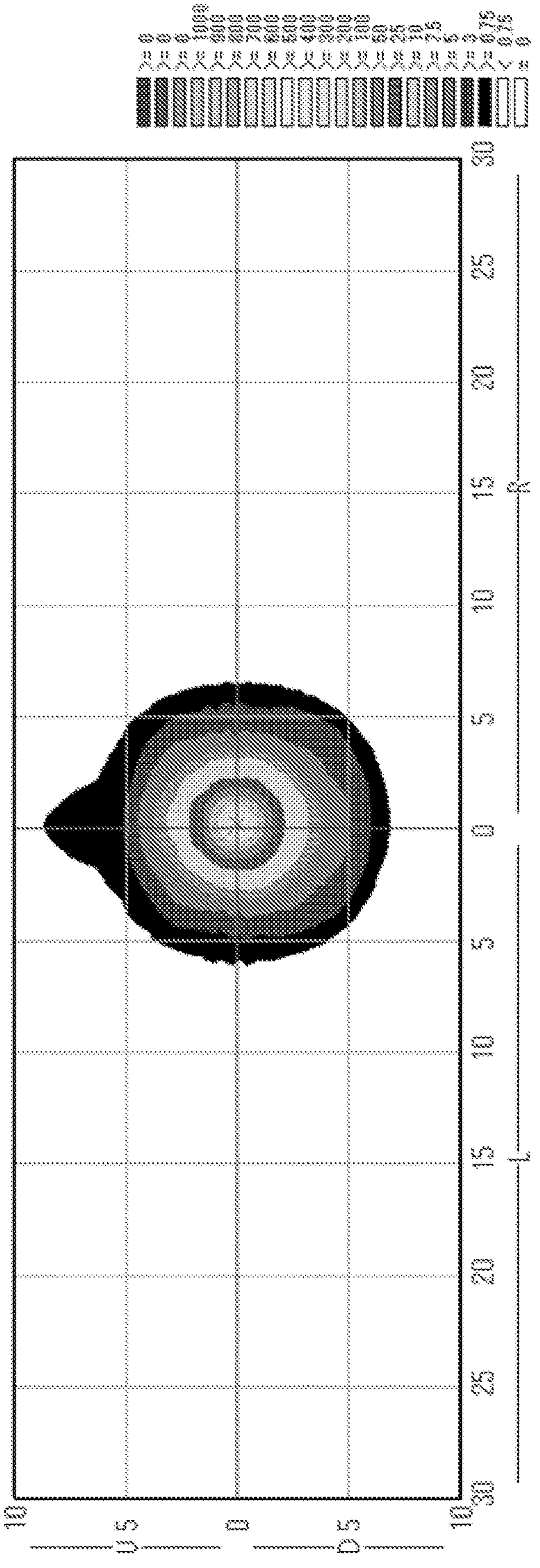
FIG. 9 is a light intensity distribution diagram showing a light distribution pattern formed on the surface of the virtual vertical screen by the light emitted from the lighting unit when the scattering and reflecting member is provided.

The light distribution pattern shown in FIG. 9 is a light distribution pattern brighter than the light distribution pattern shown in FIG. 8 by reusing the light L2 reflected by the PBS 7.

Accordingly, in the vehicle lamp 1 of the embodiment, by providing the lighting unit 2 described above, it is possible to increase the intensity of the light distribution pattern of the light L3 projected from the projection lens 9 toward the side in front of the vehicle. As a result, visibility in front of the vehicle can be enhanced, and further improvement in safety can be achieved.

In addition, in the vehicle lamp 1 of the embodiment, there is no need to prepare the liquid crystal element 5, the projection lens 9, or the like, for each of the lights L1 and L2 of the two polarized components separated by the PBS 7, and these parts can be used in common. In addition, the polarization rotation element is also unnecessary. Accordingly, it is possible to achieve reduction in the number of parts and simplification of the structure that constitute the lighting unit 2, and to achieve further miniaturization and weight reduction of the lighting unit 2.

As described above, in the vehicle lamp 1 of the embodiment, by providing the lighting unit 2, the efficiency of utilization of the light L emitted from the light source 3 can be increased, and by achieving the reduction of the number of parts and the simplification of the structure, the lighting unit 2 can be made even smaller and lighter.

Further, the present invention is not necessarily limited to the above-mentioned embodiments, and various modifications may be made without departing from the scope of the present invention.

Figure 10A:
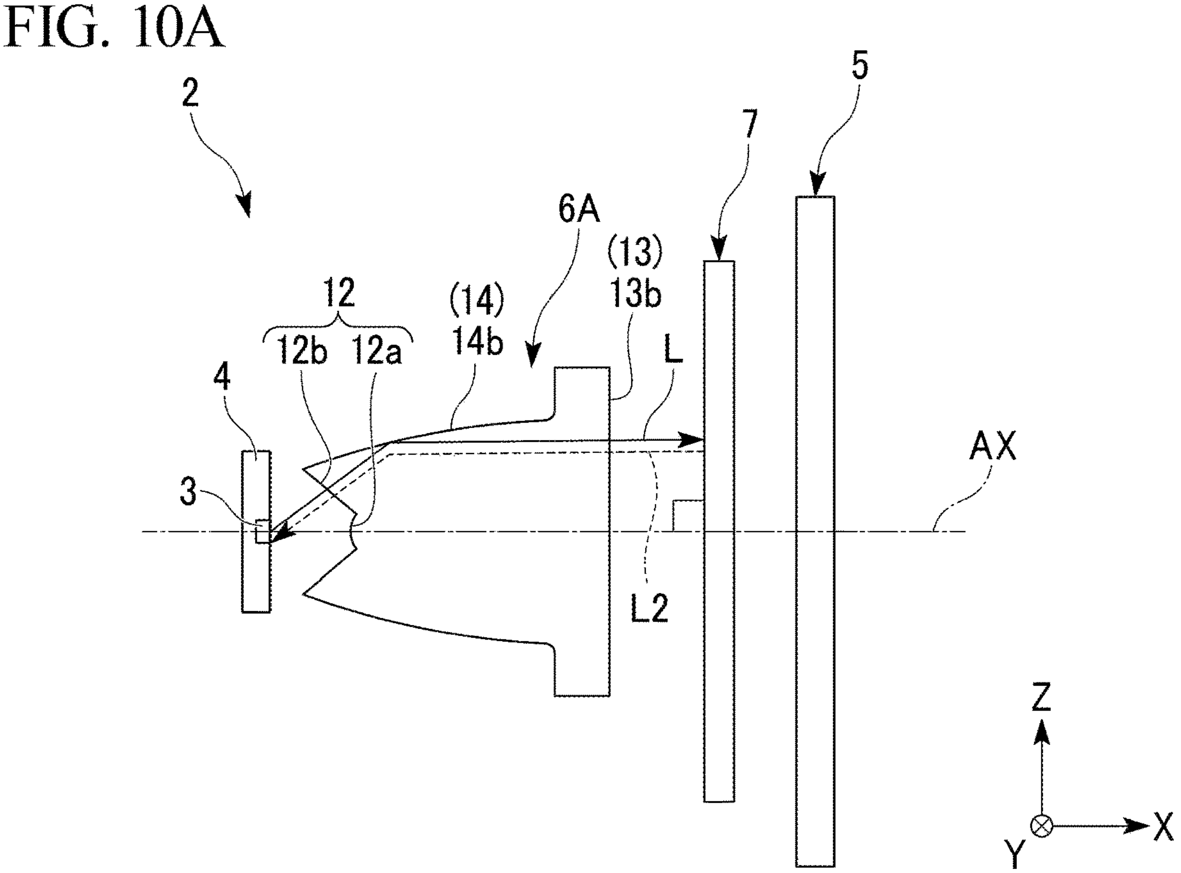
FIG. 10A is a cross-sectional view showing another configuration example of a condensing lens.
Figure 10B:
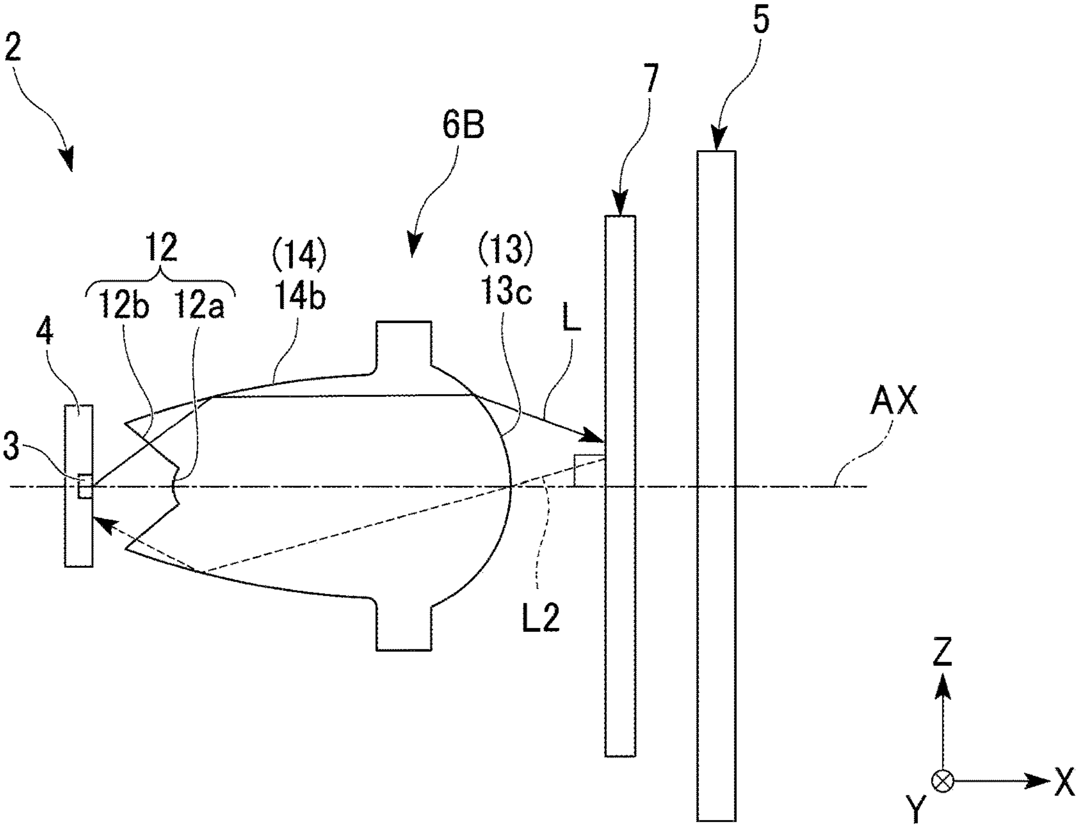
FIG. 10B is a cross-sectional view showing another configuration example of the condensing lens.

For example, the condensing lens 6 is not necessarily limited to the configuration described above, and can be configured as the condensing lenses 6A and 6B shown in FIGS. 10A and 10B, for example.

Specifically, the condensing lens 6A shown in FIG. 10A has a concavely curved parabolic reflecting surface 14*b* that draws a parabolic line instead of the oval reflecting surface 14*a*. In addition, the condensing lens 6A has a planar light emission surface 13*b* instead of the light emission surface 13*a*.

In this configuration, the parabolic reflecting surface 14*b* reflects the light L entering from the second condensing incident surface 12*b* toward the emission part 13 while parallelizing (collimating) it. In addition, the light emission surface 13*b* emits the light L entering while being parallelized (collimated) by the first condensing incident surface 12*a* and the light L entering while being parallelized (collimated) by the parabolic reflecting surface 14*b* toward the liquid crystal element 5 in front thereof.

In this configuration as well, the light L2 reflected by the PBS 7 can be reused while being repeatedly reflected between the PBS 7 and the scattering and reflecting member 4 until it becomes the light L1' containing one of the polarized components that passes through the PBS 7.

Meanwhile, the condensing lens 6B shown in FIG. 10B has the parabolic reflecting surface 14*b* curved concavely to draw a parabolic line instead of the oval reflecting surface 14*a*. In addition, the condensing lens 6B has a light emission surface 13*c* that is convexly curved forward instead of the light emission surface 13*a*.

In this configuration, the parabolic reflecting surface 14*b* reflects the light L entering from the second condensing incident surface 12*b* toward the emission part 13 while parallelizing (collimating) it. In addition, the light emission surface 13*c* emits the light L entering while being parallelized (collimated) by the first condensing incident surface 12*a* and the light L entering while being parallelized (collimated) by the parabolic reflecting surface 14*b* toward the liquid crystal element 5 in front thereof while condensing them.

In this configuration as well, the light L2 reflected by the PBS 7 can be reused while repeating reflection between the PBS 7 and the scattering and reflecting member 4 until it becomes the light L1' containing one of the polarized components that passes through the PBS 7.

Figure 11:
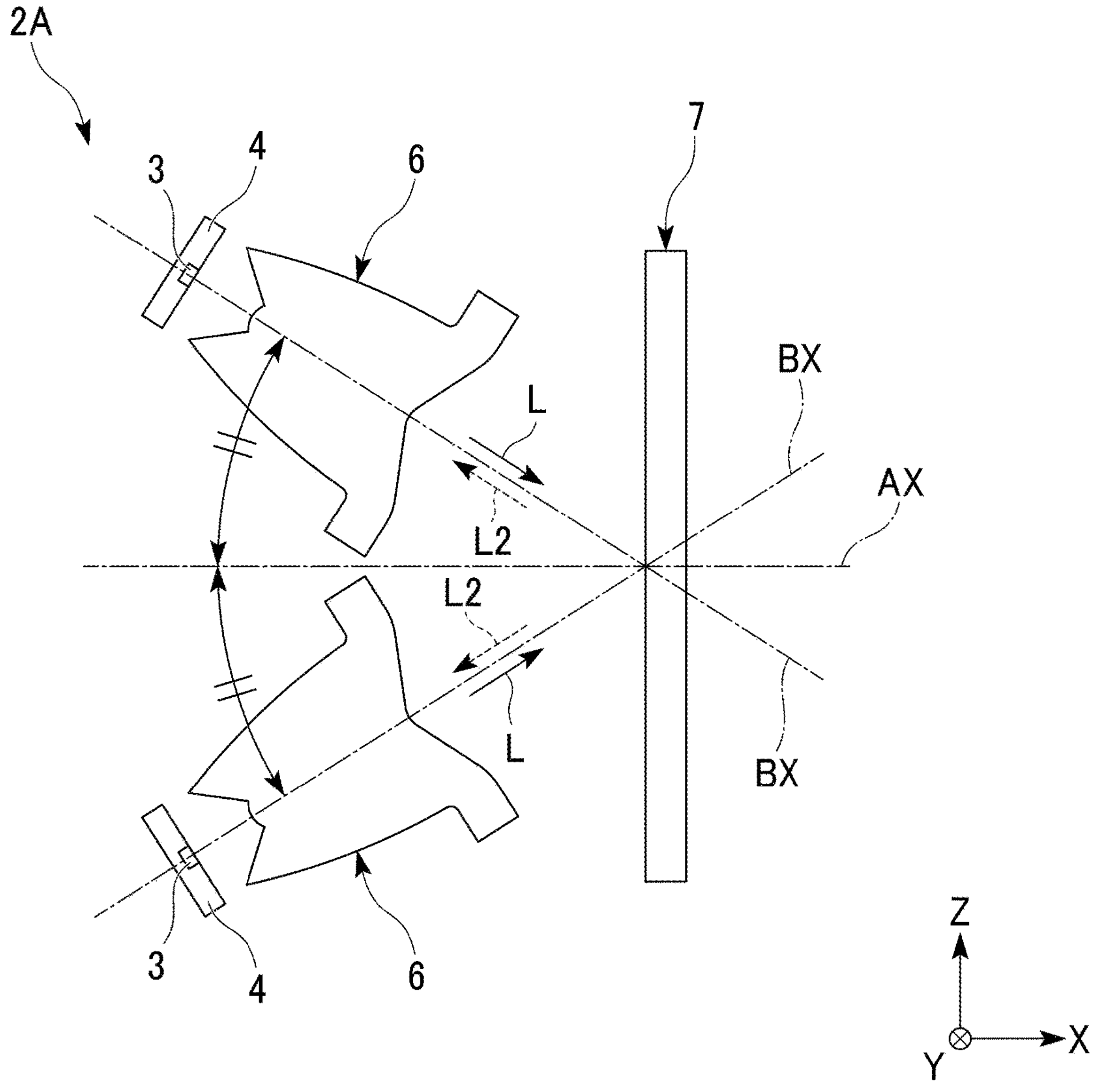
FIG. 11 is a cross-sectional view showing another configuration of the lighting unit.

In addition, in the vehicle lamp 1 of the embodiment, for example, as shown in FIG. 11, among the two lighting units 2, the lighting unit 2A may include the PBS 7, the liquid crystal element 5, the polarizing plate 8 and the projection lens 9 in common.

Specifically, the lighting unit 2A has two condensing lenses 6 with the optical axes BX of the lights L emitted from the two light sources 3 tilted at the same angle in opposite directions with each other with respect to the center axis AX described above.

In addition, the two condensing lenses 6 are disposed in a state in which each of the center axes thereof coincide with the optical axes BX of the light L emitted from each of the light sources 3, respectively. Further, the two condensing lenses 6 are rotationally symmetrical about their center axis (optical axis BX) and have the same form.

In this configuration, among the light L emitted from the condensing lens 6 of the lighting unit 2 on one side, the light L2 reflected by the PBS 7 is reflected by the scattering and reflecting member 4 of the lighting unit 2 on the other side. Accordingly, in this configuration as well, the light L2 reflected by the PBS 7 can be reused while repeating reflection between the PBS 7 and the scattering and reflecting member 4 until it becomes the light L1' containing one of the polarized components that passes through the PBS 7.

Further, the condensing optical system 6 is not limited to the above-described condensing lens, but may also be constituted by a reflector or a combination of a lens and a reflector.

In addition, the projection optical system 9 is not limited to the projection lens described above, but may also be constituted by a reflector or a combination of a lens and a reflector.

Further, the case in which the present invention is applied to the above-mentioned light distribution variable headlamp (ADB) has been described in the embodiment, in addition to this, the present invention can be applied to a light distribution variable headlight system (AFS: adaptive front-lighting system) configured to secure visibility in a direction of advance of the vehicle by controlling a liquid crystal element and enlarging an irradiation range of a passing beam in a direction of advance of the vehicle according to a steering angle (cutting angle) or a speed (vehicle speed) of a traveling vehicle.

In addition, the present invention can be applied to a bi-function type vehicle lamp capable of switching between a light distribution pattern for a low beam including a cutoff line at an upper end as a passing beam (low beam) and a light distribution pattern for a high beam located above the light distribution pattern for a low beam as a traveling beam (high beam) using one lighting unit.

REFERENCE SIGNS LIST

1 Vehicle lamp
2 Lighting unit
3 Light source
4 Scattering and reflecting member
5 Liquid crystal element
6 Condensing optical system (condensing lens)
7 Polarization beam splitter (PBS)
8 Polarizing plate
9 Projection optical system (projection lens).

The invention claimed is:

1. A vehicle lamp comprising:

a light source configured to emit light;

a liquid crystal element configured to variably modulate a polarization state of the light emitted from the light source;

a condensing optical system configured to condense the light emitted from the light source toward the liquid crystal element;

a polarization beam splitter configured to transmit light containing one of polarized components of the light condensed by the condensing optical system toward the liquid crystal element and configured to reflect light containing the other polarized component of the light condensed by the condensing optical system toward the light source; and a scattering and reflecting member disposed at a surrounding of the light source and configured to scatter and reflect the light reflected by the polarization beam splitter toward the condensing optical system.

2. The vehicle lamp according to claim 1, comprising a polarizing plate disposed close to the liquid crystal element at front of the liquid crystal element and configured to transmit light with a specified polarized component among the light modulated by the liquid crystal element, wherein the liquid crystal element is located at a condensing point of the light condensed by the condensing optical system or in a vicinity of the condensing point of the light condensed by the condensing optical system.

3. The vehicle lamp according to claim 2, comprising a projection optical system disposed in front of the polarizing plate and configured to project the light passing through the polarizing plate forward.

4. The vehicle lamp according to claim 1, wherein the condensing optical system includes a condensing lens which includes an incidence part located at a side facing the light source and configured to allow entry of the light emitted from the light source, an emission part located at a side opposite to the incidence part and configured to emit the light entering from the incidence part toward outside, and a reflection part located at a surrounding between the incidence part and the emission part and configured to reflect the light entering from the incidence part toward the emission part.

5. The vehicle lamp according to claim 4, wherein the reflection part includes an oval reflecting surface.

6. The vehicle lamp according to claim 4, wherein the reflection part includes a parabolic reflecting surface.

7. The vehicle lamp according to claim 4, wherein the condensing lens has a rotationally symmetrical form with respect to a center axis of the condensing lens, and is disposed in a state in which the center axis coincides with an optical axis of the light emitted from the light source.

* * * * *